G. S. SOLOMON.
WINDMILL.
APPLICATION FILED DEC. 1, 1915.

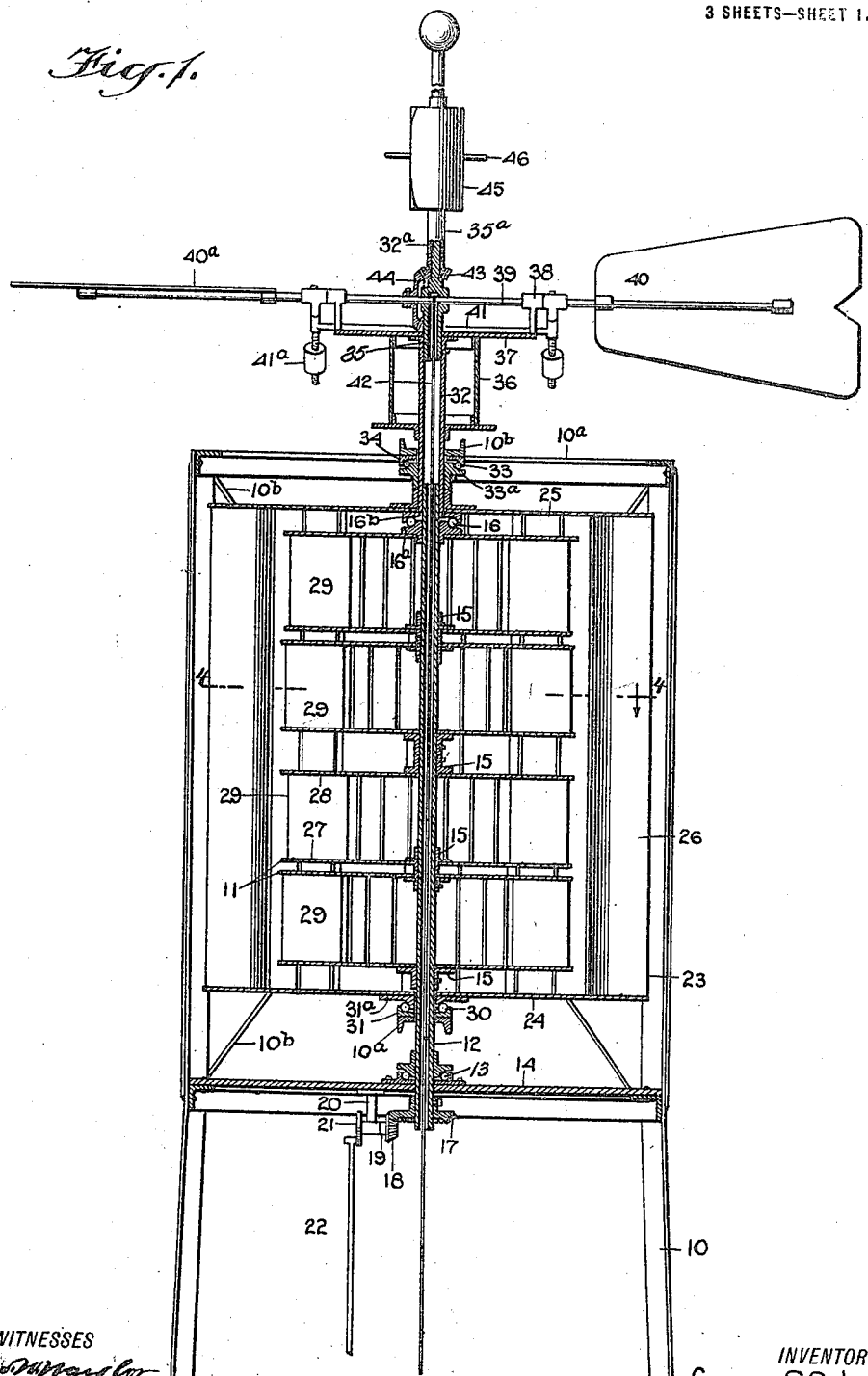

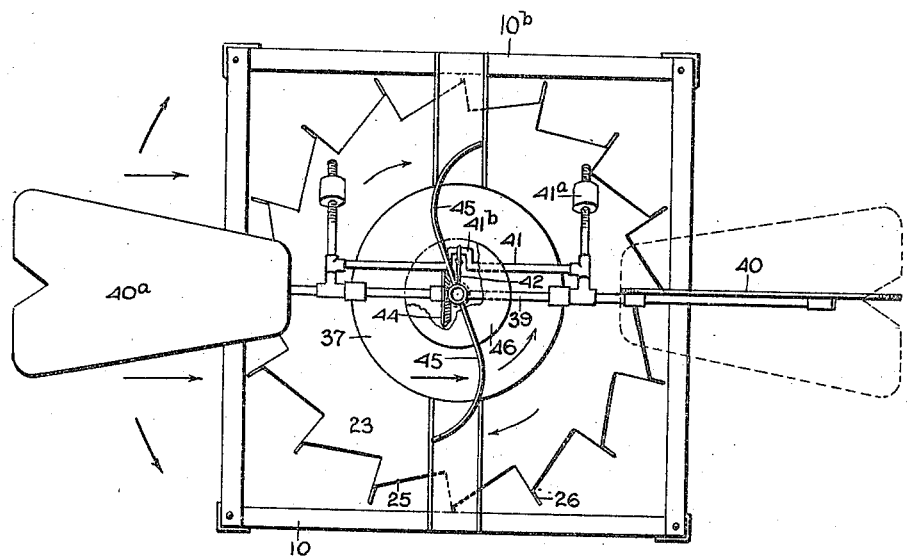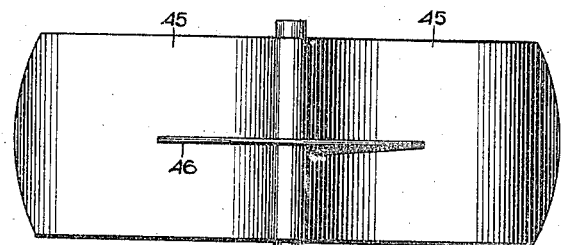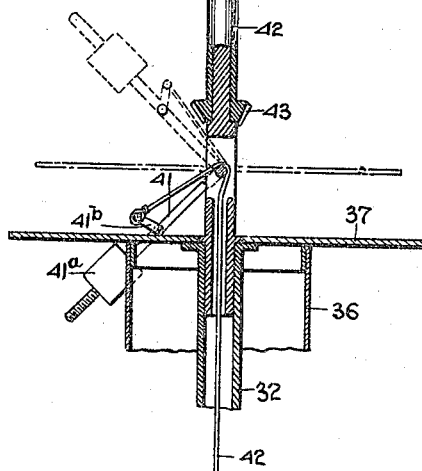

1,234,405.

Patented July 24, 1917.
3 SHEETS—SHEET 3.

WITNESSES

INVENTOR
George S. Solomon
BY
ATTORNEYS

UNITED STATES PATENT OFFICE.

GEORGE S. SOLOMON, OF DOUGLAS, ARIZONA, ASSIGNOR OF ONE-HALF TO ZENO LA BRIER, OF DOUGLAS, ARIZONA.

WINDMILL.

1,234,405.  Specification of Letters Patent.  Patented July 24, 1917.

Application filed December 1, 1915. Serial No. 64,463.

*To all whom it may concern:*

Be it known that I, GEORGE S. SOLOMON, a citizen of the United States, and a resident of Douglas, in the county of Cochise and State of Arizona, have invented a new and Improved Windmill, of which the following is a full, clear, and exact description.

My invention relates to a wind mill having turbine wind wheel elements, together with means to automatically throw the wheel out of operation upon a predetermined increase in the wind.

Prime objects of my invention are to provide a wind mill in which separate power units may be assembled in any desired number within the tower; and to provide a wind deflector arranged to direct the wind to the power units and to be automatically given a partial turn whereby to deflect the wind away from the power units.

Other objects and advantages of the invention will appear from the more particular description following.

Reference is had to the accompanying drawings forming part of this specification, in which similar characters of reference indicate corresponding parts in all the views, and in which:

Figure 1 is a transverse vertical section of a wind mill embodying my invention;

Fig. 2 is a plan view;

Fig. 3 is a side elevation partly in section of means for controlling the deflector to throw the wind mill into and out of operation;

Figure 5:
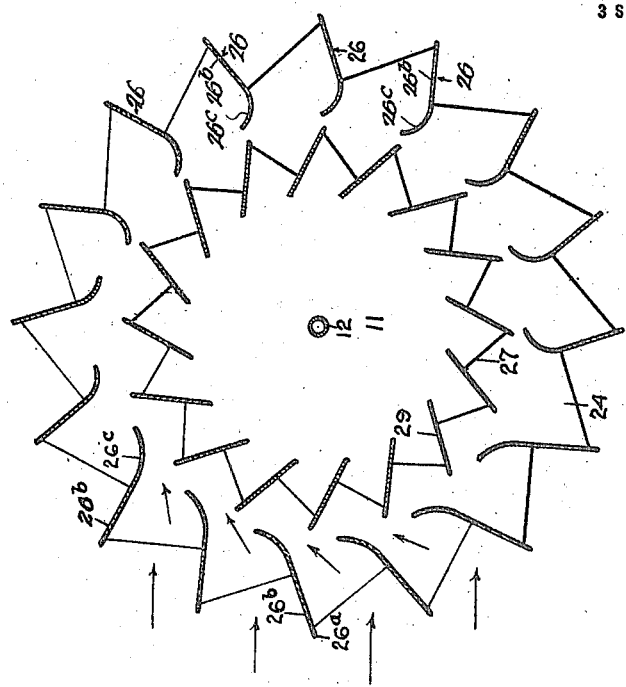
Fig. 5 is a view similar to Fig. 4 showing the relation of the power wheel and deflector when the wind mill is out of operation.

In constructing a wind mill in accordance with the illustrated example, the tower 10 is constructed preferably of angle iron. Within the tower 10 I provide a series of turbine wheel units 11, four being shown in the present example. The units are secured to a vertical hollow shaft 12 which turns on bearings of any approved form and arrangement. I have indicated roller bearings 13 in the lower end of the shaft on a platform or spider 14, and an upper bearing 16, hereinafter referred to, which may be a roller bearing, ball bearing, or the like. The wind wheel units 11 are secured in any suitable manner to the hollow shaft 12. The form shown is given as one example of a construction that will permit units to be assembled or removed with facility. In the illustrated construction flanged set collars 15 on the respective units 11 are detachably secured to the hollow shaft 12 in suitable number.

In the illustrated construction the drive mechanism comprises a beveled spur pinion 17 on the hollow shaft 12 and a mating beveled spur pinion 18 on a short shaft 19 having bearings in a hanger bracket 20 on the underside of the platform or spider 14. The shaft 19 is shown with a crank disk 21 to the wrist pin of which is connected a pump rod 22. It will be understood that any other drive means for actuating the pump or other machine may be employed in practice.

My improved deflector, designated generally by the numeral 23, is arranged outside of the wind wheel units 11, and mounted to be turned. It comprises a bottom frame or spider 24, an upper frame or spider 25, and vertical deflecting blades 26, 26ª. Each wind wheel unit 11 comprises a bottom member or spider frame 27, a top member or spider frame 28, and vertical blades 29.

Figure 4:
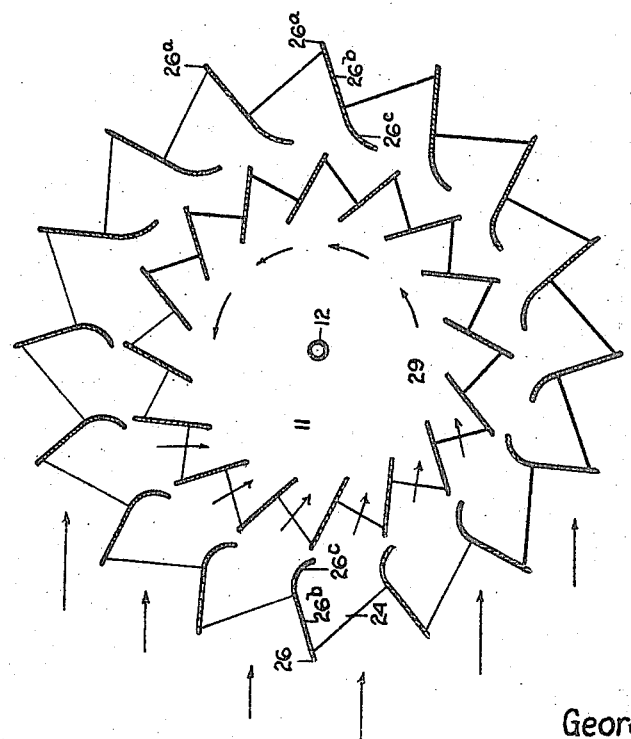
Fig. 4 is a sectional plan view on the line 4—4 of Fig. 1 showing the relation of the power wheel and deflector when the wind mill is in operation.

The form and arrangement of the respective blades are best seen in Figs. 4 and 5. It will be seen that the power blades 29 are flat throughout, being disposed tangentially and presenting plane surfaces. The blades of the deflector present each a plane surface 26ᵇ extending from the outer edge inwardly and a laterally curved surface 26ᶜ at the inner edge of the blade. The blades 26 at one side of the wheel have their curved portions 26ᶜ the reverse of the blades 26ª at the opposite side, there being an equal number of the blades at each side. The blades 26 when presented to the wind side of the wheel serve to direct the wind into the power wheel between the blades 29. On the other hand, when the blades 26ª are presented to the wind, the wind is directed away from the power blades and the wind mill stopped. In Fig. 4 the blades 26 are in the wind and therefore the power wheel 11 will be turned in the direction of the curved arrows in said figure. In Fig. 5 the deflector has been turned through 180 degrees and the deflector blades 26ª presented to the wind, so that the curved inner edges 26° of the blades 26ª deflect the wind away from the power blades. For the maximum efficiency, the blades of the power wheel and deflector should be exactly the width of the space between the blades; also, the relation of adjacent deflector blades to each other is such that a line drawn perpendicular to the plane surface of the blade at the junction of the plane and curved surfaces, will intersect an adjacent blade near the outer edge of the adjacent blade. The adjacent blades 29 of the power wheel have a similar relation.

Any approved bearings may be provided for the deflector 23. I have shown at the bottom ball bearings 30 received between a cone 31 on a cross-bar 10ª of the frame 10, and an upper cone member 31ª rigid with the underside of the deflector 23. At the upper side of the deflector 23 a vertical tube 32 is provided in fixed relation to the deflector and receives the upper end of the hollow shaft 12 of the power wheel. Ball bearings 33 are illustrated in the present instance, these being received in a cone member 33ª on the tubular standard 32 and an upper cone member 34 on the underside of the cross-bar 10ª of the frame 10. The ball bearings or equivalent bearings 16 may turn between a cone 16ª rigid with the hollow shaft 12 and upper power wheel unit 11 and a reverse cone member 16ᵇ rigid with the top 25 of the deflector.

In order that the deflector 23 may be turned through 180 degrees to cut out the wind wheel or to throw the same into the wind, I provide means whereby the deflector may be turned manually, if desired, and will also be turned automatically under a predetermined wind pressure. For the purpose mentioned, a frame-work 36 on the tubular standard 32 has a platform 37 provided with bearing 38 on which turns the shaft 39 carrying vanes 40, 40ª at opposite ends disposed in planes at right angles to each other. The shaft 39 is under the influence of a weighted frame 41 having adjustable weights 41ª thereon, and the weights normally tend to position the shaft 39 and vanes 40, 40ª so disposed that one tail vane 40 will be vertical and subject to the wind pressure to maintain the deflector 23 and the power wheel in the wind. A turning of the shaft 39 through 90 degrees will reverse the position of the blades 40, 40ª, bringing the tail vane that was vertical to a horizontal position and the vane that was horizontal to the vertical position, so that the deflector will be thus brought to position to cut out the wind wheel in the following manner: to manually turn the shaft 39, a cord or other flexible element 42 extends through the hollow shaft 12 into the tubular lower end of a post 35 in fixed relation with the tubular standard 32. The cord 42, see Figs. 2 and 3, runs over the shaft 39 and is secured to a crank arm 41ᵇ, or the like, on the frame 41; so that a pull on the cord 42 will raise the frame 41 against the gravity of the weights 41ª, and thereby rock or turn the shaft 39 to reverse the positions of the tail vanes 40, 40ª. It will be seen that when the shaft 39 is turned by the pull cord 42 sufficient to reverse the positions of the tail blades 40, 40ª, the wind pressure on the now vertically disposed tail blade 40ª will cause the tubular standard 32 to be turned through 180 degrees and with it, the deflector 23; whereby the blades 26 will be thrown out of the wind and the blades 26ª brought into the wind, as in Fig. 5.

In order to automatically cause the deflector to be turned to throw the wind mill out of operation, I provide on the reduced upper end 32ª of the post 35 a loose sleeve 35ª having a beveled pinion 43 thereon meshing with a beveled pinion 44 on the shaft 39. Thus the sleeve 35ª is capable of receiving a turning movement about the post 35 and therefore relatively to the tubular standard 32 and relatively to the deflector 23, but it turns bodily with the deflector and the shaft 39 when the tail vanes 40, 40ª turn the deflector. In fixed relation with the sleeve 35ª are two diametrically disposed and reversely curved or cut out wheel blades 45. The blades 45 present broad surfaces to the wind, but the reverse curvature will give one blade a preponderance of resistance to the wind pressure. Thus, upon the wind reaching a predetermined pressure, the blades 45 will be turned through a slight angle and through the pinions 43, 44 will give a turning movement to the shaft 39 to reverse the positions of the tail vanes 40, 40ª, so that the vane 40 that previously maintained the deflector in position to direct wind to the power wheel, will be disposed horizontally and the blade 40ª disposed vertically and will be caught by the wind, so that the shaft 39 and the deflector 23 will be turned by the wind through an angle of 180 degrees and bring the reverse blades 26ª of the deflector into the wind so as to cut off the wind from the power wheel units 11. A disk 46 braces the cut out blades 45.

By reason of the disposition of the blades at the respective sides covering one-half the wheel, it will be seen that when the deflector is positioned to direct the wind into the wheel, it will be effective over the whole wind side of the wheel whereby to fully utilize the wind pressure throughout the whole front of the wheel.

Having thus described my invention, what I claim as new and desire to secure by Letters Patent, is:

1. In a wind mill, a wind wheel, and a deflector outside the wind wheel, said deflector having reversely disposed blades at opposite sides, the blades at one side being arranged to direct wind into the wind wheel and the blades at the opposite side being arranged to deflect the wind away from the wind wheel, said deflector being mounted to be turned to bring either set of blades into the wind.

2. In a wind mill, a wind wheel mounted to turn on a vertical axis, a deflector mounted to turn on a vertical axis and having an annular series of approximately vertical blades outside the wind wheel, the blades at opposite sides of the deflector being reversed, and means subject to variation of wind pressure to turn the deflector to bring the blades at either side into the wind.

3. In a wind mill, a wind wheel, a deflector mounted to turn outside the wind wheel, said deflector being formed at one side to cut off the wind from the wind wheel and formed at the opposite side to direct wind into the wind wheel, means normally tending to position the deflector to direct wind to the wind wheel, means subject to wind pressure to automatically turn the deflector, and means subject to wind pressure to give initial movement to the second means and dispose the same in position to be further turned by the wind.

4. In a wind mill, a wind wheel, a deflector formed at one side to direct wind into the wind wheel and formed at the opposite side to deflect wind away from the wind wheel, said deflector being arranged outside the wind wheel and mounted to be turned relatively to the latter, a shaft having vanes at opposite ends disposed at right angles to each other and said shaft being mounted to turn bodily with the deflector and adapted to be rocked to reverse the positions of the vanes thereof, and means to rock said shaft to present either vane thereof to the wind to permit the wind to turn the shaft and deflector.

5. In a wind mill, a wind wheel, a deflector formed at one side to direct wind into the wind wheel and formed at the opposite side to deflect wind away from the wind wheel, said deflector being arranged outside the wind wheel and mounted to be turned relatively to the latter, a shaft having vanes at opposite ends disposed at right angles to each other and said shaft being mounted to turn bodily with the deflector and adapted to be rocked to reverse the positions of the vanes thereof, means normally tending to dispose the said shaft with its vanes in position for the wind to maintain the deflector in position to direct wind to the wind wheel, and means to overcome the first means and dispose the shaft in position that its vanes will maintain the deflector in position to deflect the wind from the wind wheel.

6. In a wind mill, a wind wheel, a deflector formed at one side to direct wind into the wind wheel and formed at the opposite side to deflect wind away from the wind wheel, said deflector being arranged outside the wind wheel and mounted to be turned relatively to the latter, a shaft having vanes at opposite ends disposed at right angles to each other and said shaft being mounted to turn bodily with the deflector and adapted to be rocked to reverse the positions of the vanes thereof, means normally tending to dispose the said shaft with its vanes in position for the wind to maintain the deflector in position to direct wind to the wind wheel, reversely curved wind blades mounted to turn with the vane shaft and also independently of the said shaft, and connections between the said blades and the vane shaft to rock said shaft by the turning of said blades.

7. In a wind mill, a frame, a series of separate wind wheel units superposed in the frame and adapted to turn in unison therein, and a deflector outside the wind wheel units and having vertical blades common to the several units, said deflector being mounted to be turned relatively to the wind wheel units and having the blades at one side adapted to direct the wind into the wind wheel units and the blades at the opposite side adapted to deflect the wind away from the said units.

8. In a wind mill, a wind wheel, a deflector formed at one side to direct wind into the wind wheel and formed at the opposite side to deflect wind away from the wind wheel, said deflector being arranged outside the wind wheel and mounted to be turned relatively to the latter, a shaft having vanes at opposite ends disposed at right angles to each other and said shaft being mounted to turn bodily with the deflector and adapted to be rocked to reverse the positions of the vanes thereof, weighted elements on the said shaft normally holding the same with its vanes disposed to maintain the deflector in position to direct wind into the wind wheel, and means connected with said weighted elements to raise the same and rock the shaft to reverse the disposition of its vanes.

9. In a wind mill, a wind wheel, movable means to cut off wind from the wheel or direct the wind thereto, and means to control said first means, said second means comprising a shaft adapted to be turned bodily by the wind to control the first means, said shaft having vanes at opposite sides at right angles to each other, the shaft being mounted to rock to reverse the angular positions of the vanes, and means subject to wind pressure to rock the vane shaft.

10. In a wind mill, a wind wheel, a deflector mounted to be turned relatively to the wind wheel and having deflector blades outside the wind wheel, the blades at one side of the deflector being adapted to direct wind to the wind wheel and the blades at the opposite side being adapted to deflect wind away from the wind wheel, a shaft driven by the wind wheel, a vertical element supported in axial alinement to the driven shaft and in fixed relation to the deflector, a transverse shaft mounted to rock in the said vertical element and provided with vanes at the ends at right angles to each other, weighted elements on the transverse shaft normally tending to maintain the same against rocking, a sleeve on said vertical element, reversely curved blades on the sleeve diametrically opposite each other and operative connections between the sleeve and transverse shaft to rock the said shaft by the turning of the sleeve.

In testimony whereof I have signed my name to this specification in the presence of two subscribing witnesses.

GEORGE S. SOLOMON.

Witnesses:
ZENO LA BRIER,
GEORGE W. CASS.

Copies of this patent may be obtained for five cents each, by addressing the "Commissioner of Patents, Washington, D. C."